United States Patent [19]

Tsuda

[11] Patent Number: 5,619,507
[45] Date of Patent: Apr. 8, 1997

[54] METHOD AND APPARATUS FOR ESTABLISHING AND MAINTAINING FRAME SYNCHRONIZATION IN A SATELLITE COMMUNICATION SYSTEM

[75] Inventor: Hiroki Tsuda, Tokyo, Japan

[73] Assignee: NEC Corporation, Tokyo, Japan

[21] Appl. No.: 268,454

[22] Filed: Jun. 30, 1994

[30] Foreign Application Priority Data

Jun. 30, 1993 [JP] Japan .................. 5-196657

[51] Int. Cl.⁶ ................................. H04J 3/06
[52] U.S. Cl. ................ 370/350; 375/365; 370/514
[58] Field of Search ................ 370/100.1, 104.1, 370/105.1, 105.4, 106; 379/63; 375/354, 365, 366; 340/825.14, 825.2; 455/12.1, 13.1, 13.2, 13.4

[56] References Cited

U.S. PATENT DOCUMENTS

| | | | |
|---|---|---|---|
| 4,800,560 | 1/1989 | Aoki et al. | 370/104.1 |
| 5,012,491 | 4/1991 | Iwasaki | 375/365 |
| 5,020,131 | 5/1991 | Isoe | 375/365 |
| 5,206,887 | 4/1993 | Tsuda | 370/105.4 |
| 5,229,997 | 7/1993 | Hirata et al. | 370/104.1 |
| 5,333,148 | 7/1994 | Tsubaki | 375/365 |

FOREIGN PATENT DOCUMENTS

| | | |
|---|---|---|
| 0371500 | 6/1990 | European Pat. Off. . |
| 0445522 | 9/1991 | European Pat. Off. . |
| 0504905 | 9/1992 | European Pat. Off. . |
| 61-22481 | 1/1986 | Japan . |
| 62-180634 | 8/1987 | Japan . |
| 2253971 | 9/1992 | United Kingdom . |

Primary Examiner—Benedict V. Safourek
Assistant Examiner—Ricky Q. Ngo
Attorney, Agent, or Firm—Sughrue, Mion, Zinn, Macpeak & Seas

[57] ABSTRACT

An apparatus and method for establishing frame synchronization in a satellite communication system which receives a modulated signal having frames, such that a unique word and data are multiplexed in each of the frames. A demodulator demodulates the modulated signal and provides a demodulated signal including the unique words. A signal detector compares the signal power of the demodulated signal with a threshold signal and provides a detection signal. A selector provides, in accordance with the detection signal, the detected demodulated signal or fixed data as a selected signal. A frame synchronizing circuit detects the unique word from the selected signal, when the demodulated signal is provided as the selected signal by the selector, and establishes frame synchronization in accordance with the detected unique word.

28 Claims, 5 Drawing Sheets

METHOD AND APPARATUS FOR ESTABLISHING AND MAINTAINING FRAME SYNCHRONIZATION IN A SATELLITE COMMUNICATION SYSTEM

BACKGROUND OF THE INVENTION

1. Field of the Invention

The present invention relates to a method and apparatus for establishing and maintaining frame synchronization in a mobile satellite communication system, and more particularly, for establishing and maintaining frame synchronization on the basis of unique word (UW) detection to prevent erroneous operation due to shadowing phenomena occurring on the transmission path.

2. Description of the Related Art

In satellite communication systems, forward error correction (FEC) techniques with high coding gain or high-efficiency speech coding are used to reduce the required transmission power and raise the channel capacity. Usually, such satellite communication systems are operated at extremely low carrier-power to noise-power (C/N) ratios. Therefore, in a satellite communication system employing high-coding gain error correction or high-efficiency speech coding techniques, it is desirable to maintain stable frame synchronization at such low C/N ratios.

In order to access a satellite channel and thereby link the satellite channel to a station, it is necessary to synchronize the transmission and receiving timing of the frames in the signal. That is, the rate at which the frames of the communication signal are transmitted by the satellite or stations must be synchronized with the rate at which such frames are detected by the satellite or station.

Such frame synchronization can typically be accomplished by using a unique word (UW) in a preamble added to the initial portion of a burst signal, or unique words periodically provided in frames of the signal. The unique word or words used for frame synchronization can also be used to resolve phase ambiguity of the communication signal, or identify a satellite channel.

A number of different frame synchronization systems for such purposes have been proposed (see, for example, "Frame Synchronization", Japanese laid-open Patent Application No. Sho 61 (1986), and Japanese laid-open Patent No. Sho 62 (1987)-180634). Among these, the systems which establish frame synchronization by examining the demodulated bit stream on a bit-by-bit basis to detect the unique word are most common.

Figure 9:
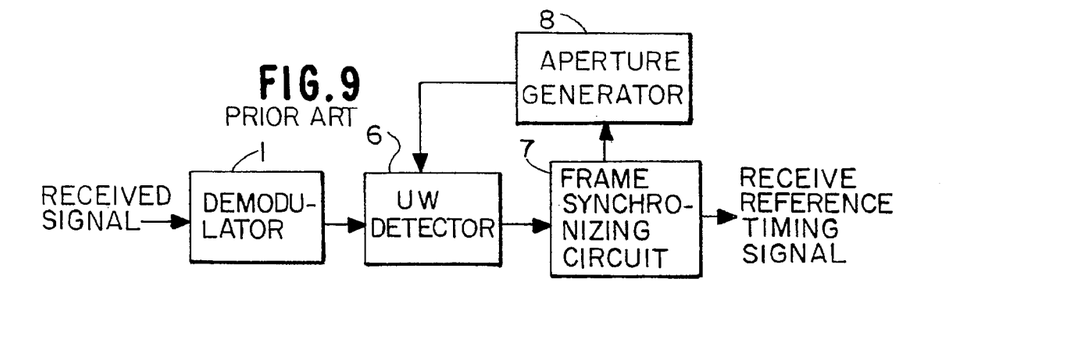
FIG. 9 is a block diagram of a conventional frame synchronization system.

FIG. 9 illustrates a block diagram of a conventional frame synchronization system. As shown, the received modulated signals are supplied to a demodulator 1 and demodulated into baseband demodulated signals. The demodulated signals are supplied to a UW detector 6, where a unique word UW is detected from the demodulated signals. When a UW is detected in the UW detector, a frame synchronizing circuit 7 sets the timing for receiving the frames based on a predetermined, prestored frame format corresponding to the detected UW.

An aperture generator 8 controls the detection aperture of the UW detector 6 in accordance with the output signal of the frame synchronizing circuit 7. The aperture of the UW detector 6 is the time period that the UW detector remains "open" to detect the communication signal.

Figure 10:
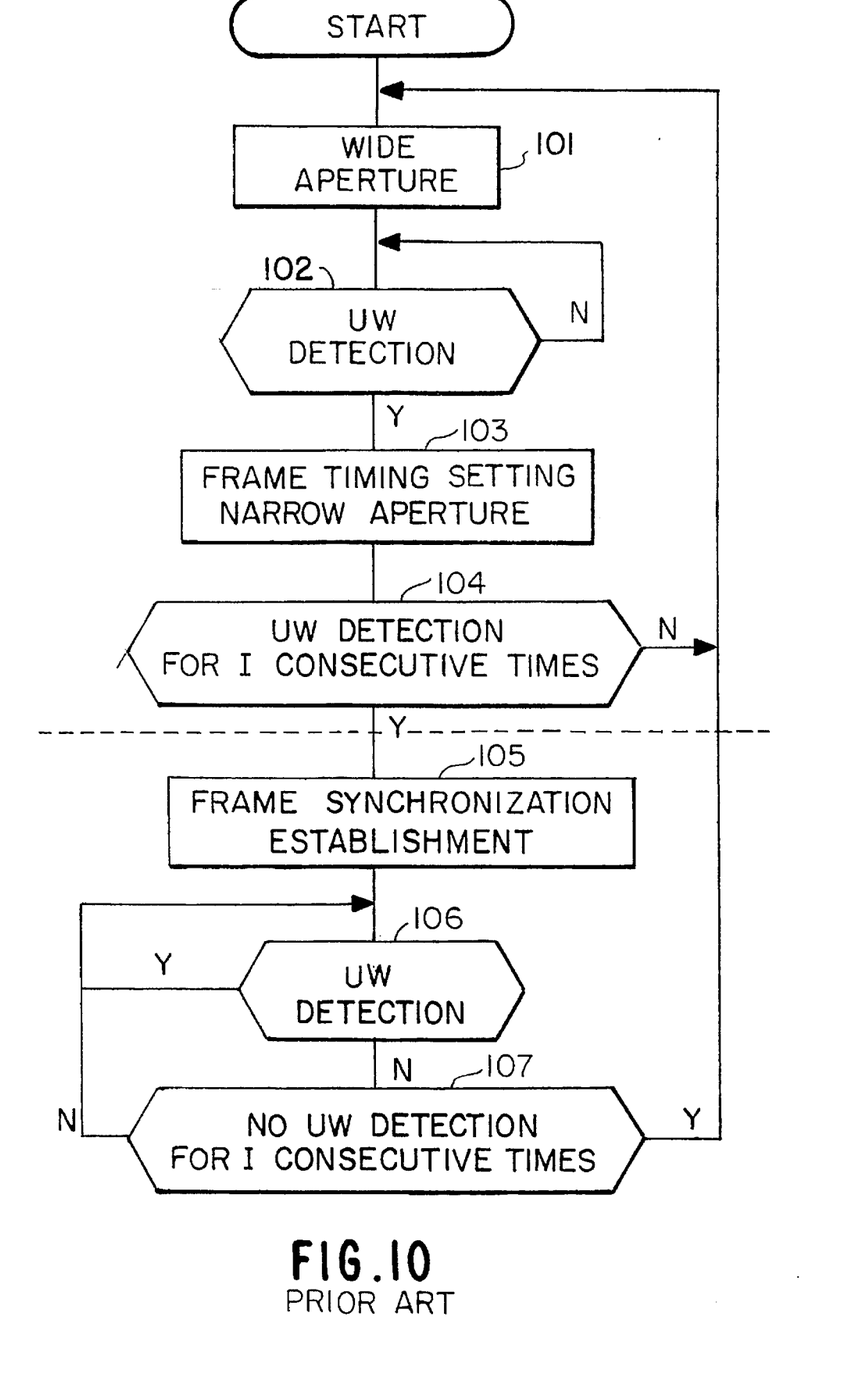
FIG. 10 is a flow chart showing the operating procedure of the conventional frame synchronizing system illustrated in FIG. 9.

Thus, the UW detector 6, frame synchronizing circuit 7 and aperture generator 8 cooperate to establish frame synchronization by the procedure shown in the flow chart of FIG. 10. That is, in steps 101 and 102 of the frame synchronization process, the UW detector 6 remains "open" to receive the communication signal until it detects an initial unique word in the communication signal. UW detectors of this type are described, for example, in "TDMA Communication" by Heiichi Yamamoto et al., a 1989 publication by the Institute of Electronics, Information and Communication Engineers, and "Elements of Digital Satellite Communication Volume 1" by W. W. Wu which was published in 1984 by Computer Science Press.

In step 103, as explained above, when the UW detector 6 detects a unique word UW in the communication signal, the UW detector provides a signal to the frame synchronizing circuit 7, which sets the timing for receiving frames in the communication signal based on a predetermined frame format corresponding to the detected unique word UW. The frame synchronizing circuit 7 also controls the UW detector 6 via the aperture generator 8 to detect unique words in narrow apertures, that is, during short time periods.

The timing at which frames are received is established by setting the receive frame counter of the frame synchronizing circuit 7, which counts periods during which frames are received. The count of the receive frame counter is used as the time reference for various functions synchronization with received frames.

To determine the next time period during which the UW detector can detect the next unique word in the communication signal, the position in the communication signal of that next unique word is estimated based on the receive frame timing. The aperture generator 8 thus generates an aperture signal according to that position, and permit the UW detector to detect a unique word only during that time period designated by the aperture signal.

The aperture generator 8 continues to generate a series of aperture signals to enable the UW detector to detect subsequent unique words UW in the communication signal. Then, to assure that frame synchronization is occurring based on the unique words in the communication signal, in step 104, it is determined whether unique words are detected "I" consecutive times with this narrow aperture (brief time period). Unless unique words have been detected I consecutive times, the processing returns to step 101, and repeats. When it is determined that unique words have been detected "I" consecutive times, in step 105, it is determined that frame synchronization has been established.

After frame synchronization has been established, in step 106, the UW detector 6 is controlled by the frame synchronizing circuit 7 and aperture generator to continue detecting unique words during the same apertures (time periods) to maintain frame synchronization. However, if at any time during the UW detection process, the UW detector 6 does not detect unique words for "J" consecutive times (i.e. "J" consecutive aperture time periods), it is determined that frame synchronization has been lost. Accordingly, the processing returns to step 101 and is repeated as described above.

Note that the value "J" is used to assure that frame synchronization actually has been lost before the processing is repeated. That is, after frame synchronization has been established, if the UW detector 6 fails to detect a unique word during, for example, only one aperture period, frame synchronization is not considered to be lost. However, if the UW detector 6 fails to detect unique words during "J" consecutive aperture periods, synchronization is presumed to have been lost, and thus, the process of FIG. 10 is repeated to resynchronize the timing of the communication. The values of "I" and "J" usually depend on the type of satellite communication systems being operated. "I" is typically equal to any number from 2 to 4, and "J" is typically equal to any number from 2 to 6.

As described above, the conventional frame synchronization system detects UW's and establishes and maintains synchronization between the transmission and receipt of the frames in the communication signal according to the number of consecutive times that the UW detector detects or fails to detect unique words. However, the conditions of the transmission paths for mobile satellite communication stations used, for example, in motor vehicles, ships, aircraft and the like, differ from those of fixed satellite communication stations. For example, when a mobile earth station is used, the communication signals are subject to a shadowing phenomena caused by buildings, terrain, and other objects which may interfere with the signal transmission.

As described above, the conventional system merely estimates the position of the unique words in the communication signal after a first unique word is received. Hence, in essence, the frame synchronization is determined based on unique word detection irrespective of whether the actual communication signal continues robe received. Hence, the system may erroneously interpret portions of noise signals to be unique words when the actual communication signals have been interrupted. Thus, the system may erroneously set the timing of the receipt of the frames based on these erroneous unique words.

Such shadowing phenomenon and modulation timing errors may be anticipated when using mobile satellite communication systems. Hence, the aperture times of the UW detector 6 may be widened (i.e the time periods during which the UW detector detects unique words are increased) to compensate for the lag in frame timing after the shadowing phenomenon and/or modulation timing errors occur. However, as the aperture size (time period) is increased, the rate of false unique word detection also may increase. Thus, the frame timing may become erroneous.

Furthermore, once erroneous frame timing is set, even if the actual communication signals are again received by the demodulator 1 in the station, it is difficult to correct a signal processing system, such as a descrambler, that has already been erroneously synchronized. Hence, numerous resynchronization attempts may be necessary.

In addition, when the unique words are used also to resolve ambiguity concerning the phase of the communication signal, any erroneous unique words cause the phase of the communication signal to be erroneously determined. Hence, it may be impossible for the phase to be determined correctly.

Due to the problems that may result when using a unconventional frame synchronization system as described above, the quality of the communication signal may be substantially degraded. Accordingly, it is necessary to provide a system whose communication signal timing is not adversely affected by shadowing phenomena or the like.

SUMMARY OF THE INVENTION

Therefore, it is an object of the present invention to provide a frame synchronization system which detects unique words only when an actual communication signal is being received. In order to achieve this object, the present invention provides a frame synchronization system for an apparatus which receives a modulated signal obtained by digital phase shift keying of a carrier wave with digital signals having frames. A unique word and data are multiplexed in each of the frames.

An embodiment of the system of the present invention comprises a demodulator for demodulating the modulated signal which has been received, and a signal detecting device for detecting the presence or absence of the demodulated signal. That is, the signal detecting device determines if the power of the demodulated signal is at least equal to a threshold level.

If the power of the demodulated signal is at least equal to the threshold level, then the signal detecting device indicates that an actual demodulated communication signal is present. However, if the power of the demodulated signal is below the threshold level, the signal detecting device indicates that no actual demodulated communication signal is present.

A selector of the system selects, according to the output detection signal of the signal detecting device, either the demodulated signal output by the demodulator or fixed data different from the unique word. That is, when the power of the demodulated signal is at least equal to the threshold level, the selector selects and outputs the demodulated signal. However, when the power of the demodulated signal is less than the threshold level, the selector selects and outputs the fixed data.

The system further comprises a unique word detector, coupled to the selector, which detects the unique word from the demodulated signal when the selector provides the demodulated signal to the unique word detector. Alternatively, when the selector provides the fixed data to the unique word detector, the unique word detector cannot mistake the fixed data with a unique word and therefore does not detect a unique word.

The unique word detector provides the detected unique word to a frame synchronizing circuit which establishes frame synchronization based on the detected unique word. Hence, when no unique word is detected (e.g when the fixed data is provided to the unique word detector), the frame synchronizing circuit will not establish frame synchronization.

The system further comprises an aperture generator, controlled by the frame synchronizing circuit, which generates an aperture signal that controls the unique word detector. That is, the aperture signal indicates the time period that the unique word detector is to be open to detect a unique word in the frame. Hence, the unique word detector will only detect unique words during an aperture period. The aperture detector thus generates successive aperture signals to enable the unique word detector to detect unique words in successive frames.

In another embodiment of the present invention, the selection circuit is removed, and an inhibitor circuit is coupled between the unique word detector and the frame synchronization circuit. When the power of the demodulated signal is at least equal to the threshold level, the inhibitor circuit outputs the detected unique word to the frame synchronization circuit. Hence, the frame synchronization circuit will establish frame synchronization. However, when the power of the demodulated signal is less than the threshold level, the inhibitor circuit inhibits the detected unique word from being output to the frame synchronization circuit. Hence, the frame synchronization circuit will not establish frame synchronization.

BRIEF DESCRIPTION OF THE DRAWINGS

The present invention will described in further detail below with reference to the accompanying drawings, in which:

FIGS. 7 (A)–(D) are timing charts showing the operation of the frame synchronization system of the embodiment of the present invention illustrated in FIG. 1;

DETAILED DESCRIPTION OF THE PREFERRED EMBODIMENTS

Figure 1:
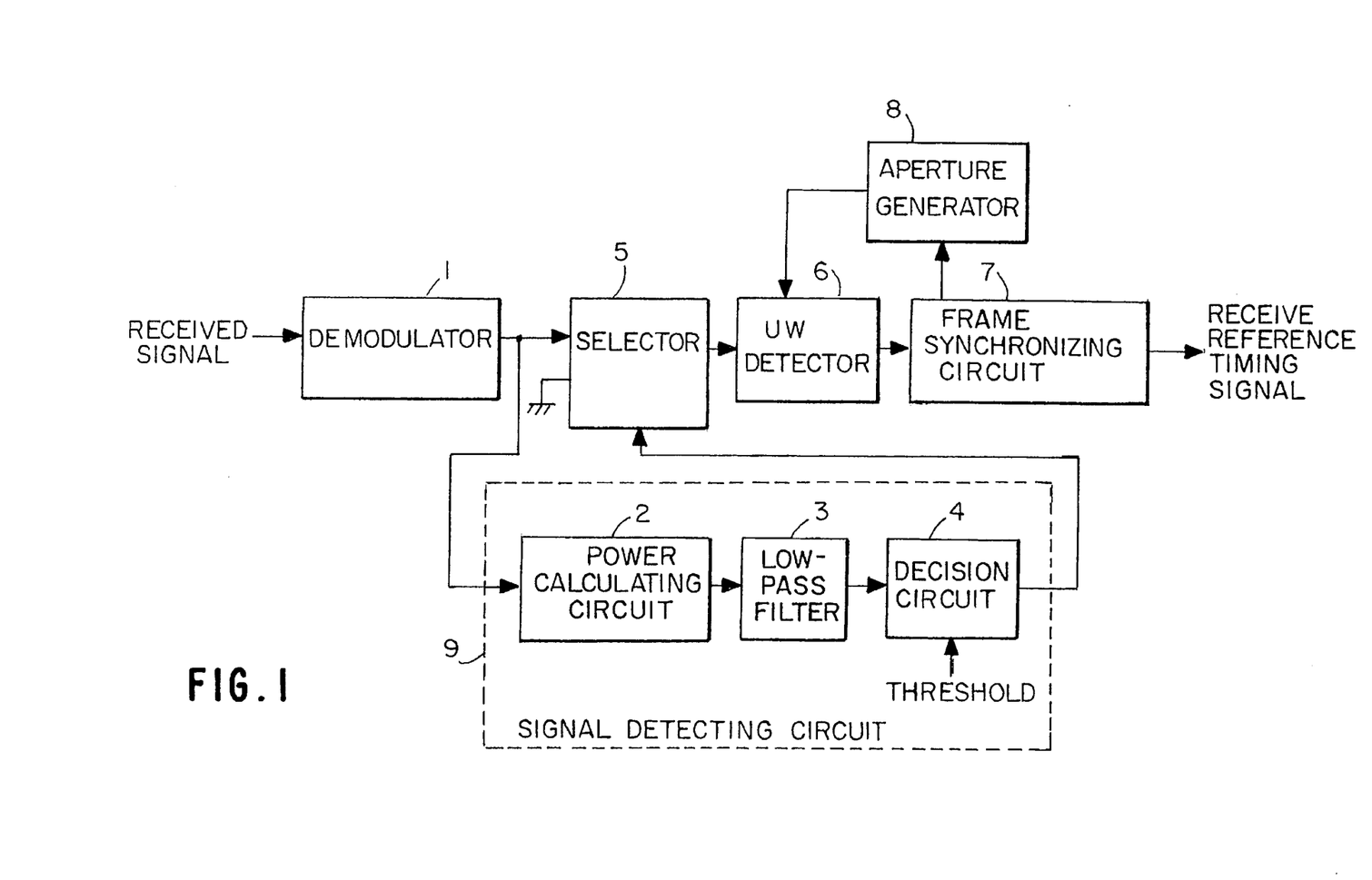
FIG. 1 is a block diagram of an embodiment of a frame synchronization system of the present invention.

FIG. 1 is a block diagram of an embodiment of a frame synchronization system of the present invention. Items which are the same as those shown in FIG. 9 are identified by corresponding reference numerals.

In particular, the embodiment shown in FIG. 1 is an example of a mobile earth station of a mobile satellite communication system, in which communication signals are received and demodulated by a demodulator 1. These received communication signals include, for example, digital signals of a modulated signal generated, for example, by phase shift keying (PSK) of the carrier. The digital signals have a predetermined frame format such as that shown in FIG. 2.

Figure 2:
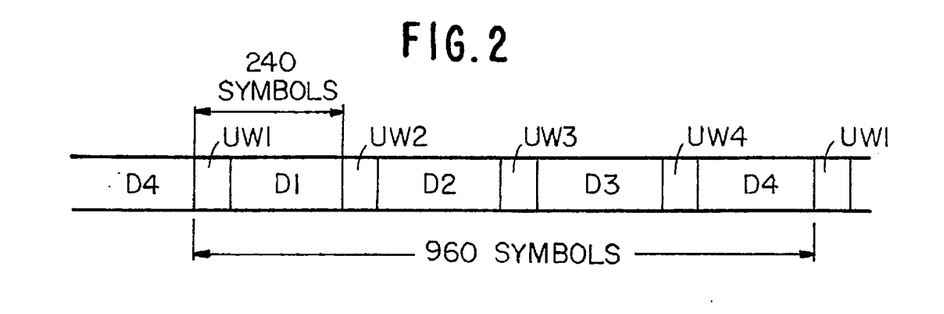
FIG. 2 illustrates an example of a frame format used in the embodiment of the present invention shown in FIG. 1.

In the frame format illustrated in FIG. 2, one frame consists of 240 symbols. These 240 symbols include a unique word UWm (where "m" is 1, 2, 3 or 4) and data Dm, which are multiplexed on a time division basis. Four frames (960 symbols) constitute each transmission unit. Of course, the number of symbols in each frame and the number of frames in each transmission unit can vary as desired. Also, the amount of unique words can vary in accordance with the amount of frames per transmission unit.

The transmission rate may be, for example, 4,000 baud, at which 240 symbols are transmitted in 60 ms. However, any suitable baud rate may be used.

The unique words UW1 through UW4 are determined by the autocorrelation of each unique word with front and back sequence and the cross-correlation between unique words, or in accordance with the Hamming distance. For example, where the modulated signal is quadrature phase shift keying (QPSK), the unique word consists of 24 bits total with "0001 0111 1101" being in the "I" (in-phase) signal and "0011 0100 0110" being in the "Q" (quadrature) signal. Alternatively, where the modulated signal is binary phase shift keying -(BPSK), it has, for example, a fixed 32-bit pattern of "0100 1000 0101 0111 0110 0011 1110 0110". However, any suitable bit amount or pattern may be used.

Figure 3:
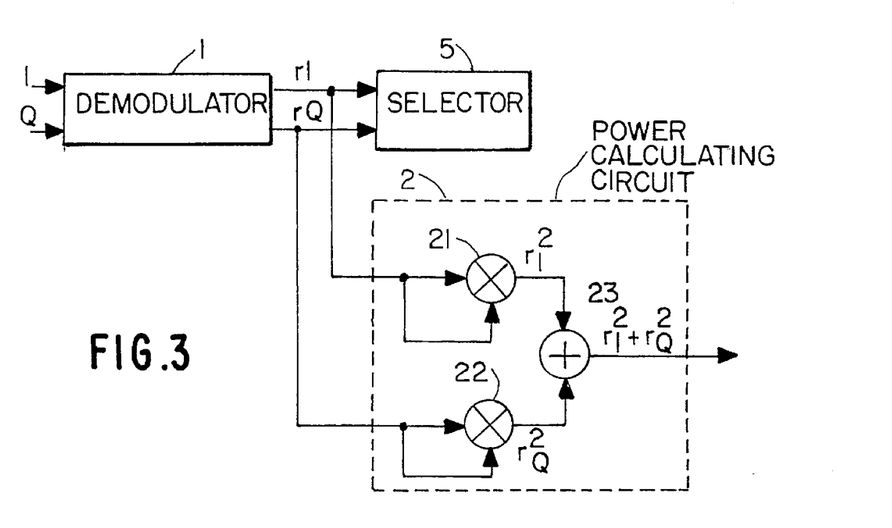
FIG. 3 shows an embodiment of the power calculating circuit of the embodiment of the present invention illustrated in FIG. 1.

Referring to FIG. 1, the output demodulated signal of the demodulator 1 is supplied to a power calculating circuit 2 and to selector circuit 5. The power calculating circuit 2, together with a low-pass filter 3 and decision circuit 4, comprise the signal detecting circuit 9. The power calculating circuit 2 has a circuit configuration comprising, for example, as illustrated in FIG. 3, a first multiplier 21, a second multiplier 22 and an adder 23.

The first multiplier 21 squares the in-phase component $r_1$ of the demodulated signal provided from the demodulator 1, and the second multiplier 22 squares the quadrature component $r_Q$ of the demodulated signal. Adder 23 adds these squared signals output from the multipliers 21 and 22, and thus outputs an addition signal represented by $(r^2_1+r^2_Q)$. This addition signal has a level corresponding to the signal power (actually, the sum of the signal power and the noise power).

Figure 4:
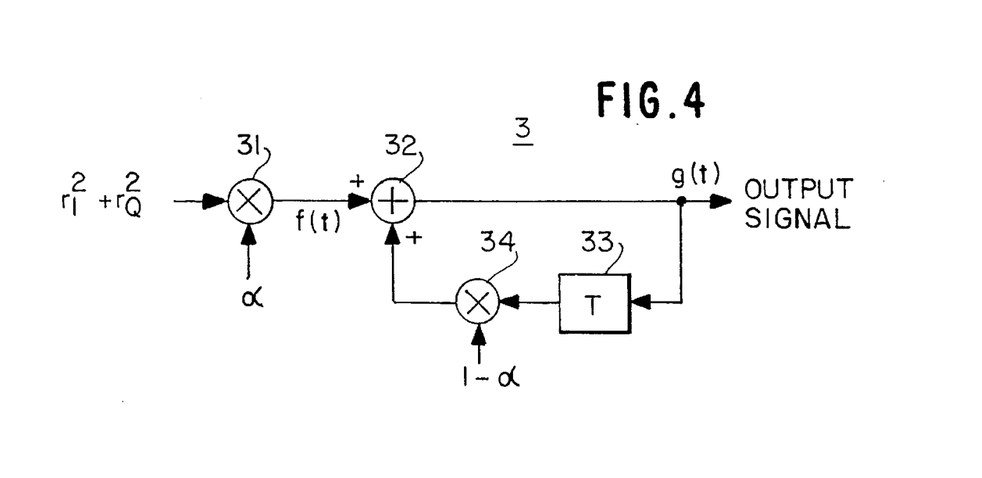
FIG. 4 illustrates an embodiment of the low-pass filter of the embodiment of the present invention shown in FIG. 1.

As shown in FIG. 4, the low-pass filter 3, which averages said signal power, has a circuit configuration comprising, for example, a first multiplier 31, an adder 32, a delaying circuit 33 and a second multiplier 34. The first multiplier 31 multiplies the addition signal provided from the power calculating circuit 2 by a constant α. The adder 32 adds the output signals of the multipliers 31 and 34. The delaying circuit 33 delays the input signal by one sampling period. The second multiplier 34 multiplies by a constant (1–α) the signal supplied by the delaying circuit 33 which is a signal of a sampling period that is one sampling period prior to the present sampling period.

In this configuration, the output signal of the first multiplier 31 is represented by f(t), the output signal of the adding circuit 32 is represented by g(t), and the constant (1–α) is equal to k. Hence, the input-output relationship is:

$$g(t)=f(t)+k \cdot g(t-T)$$

Fourier transformation of this equation provides a transfer function G(ω) represented by the following equation:

$$G(\omega)=1/\{1-k \cdot exp(-j\omega T)\}$$

This equation represents a low-pass filter characteristic.

Figure 5:
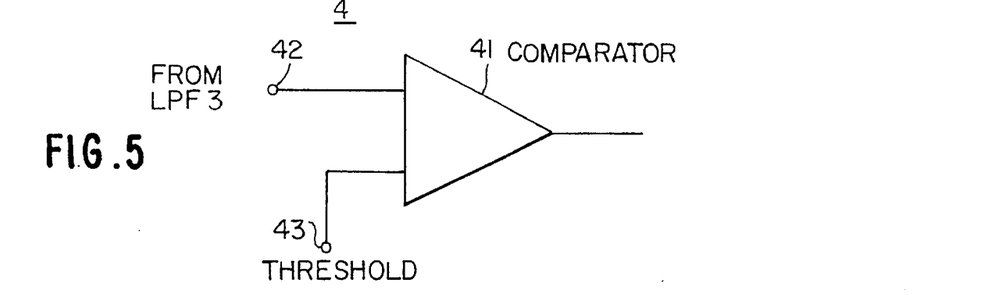
FIG. 5 illustrates an embodiment of the decision circuit of the embodiment of the present invention shown in FIG. 1.

As shown in FIG. 5, the decision circuit 4 of the embodiment shown in FIG. 1 comprises a comparator 41, which compares a signal at all input terminal 42 with a reference value (threshold) at an input terminal 43, and supplies a first logical level (a high level for example) when the input signal level is at or above the threshold, or a second logical level (a low level for example) when the input signal level is below the threshold. In this embodiment, this threshold is set from a level matching or approximately matching the demodulation output to a level approximately 6 dB or more below the constant received signal level as a result of input signal level drop.

As shown in FIG. 1, the selector circuit 5, into which the demodulated signal from the demodulator 1 and fixed data (for example, ground which provides all "0" data) are entered, selects one or the other of these input signals according to the output signal of the decision circuit 4, and supplies the selected signal to a unique word detector 6.

The operation of the embodiment shown in FIG. 1 will now be described with reference to the timing charts of FIGS. 7(A)–(D). As typically shown in FIG. 7(A), communication signals have been received between time $t_1$ and $t_3$ and at and after time $t_3$. When this occurs, the output signal level of the low-pass filter 3, as indicated by the solid line in FIG. 7(B), begins to rise after the received signal input time $t_1$.

Figures 7A, 7D:
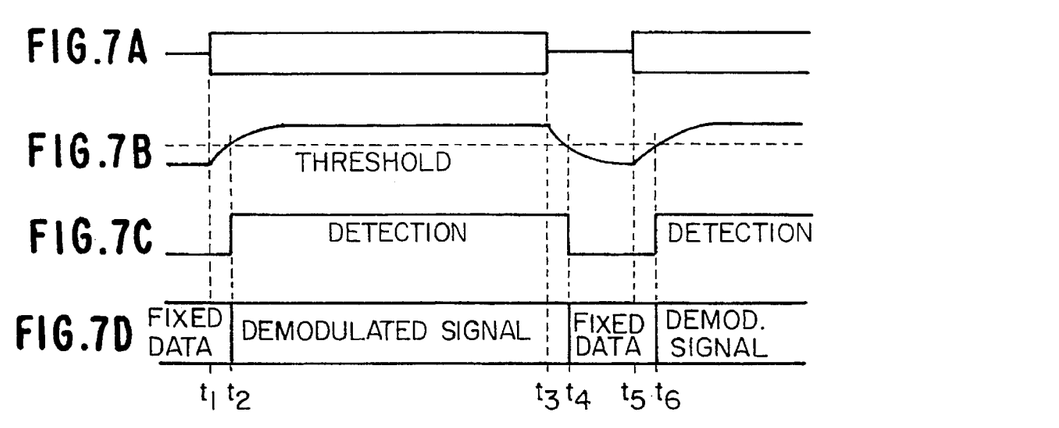

At time $t_2$, the output signal level of the lowpass filter 3 surpasses the threshold level (indicated by the broken line in FIG. 7(B)) of the decision circuit 4. This causes the decision circuit 4, as shown in FIG. 7(C), to supply, for example, a received signal detection signal having a high level. The selector 5, from time $t_2$ at which it receives this high level received signal detection signal, selects the output demodulated signal of the demodulator 1 as typically shown in FIG. 7(D), and supplies this output demodulated signal to the UW detector 6.

Figure 6:
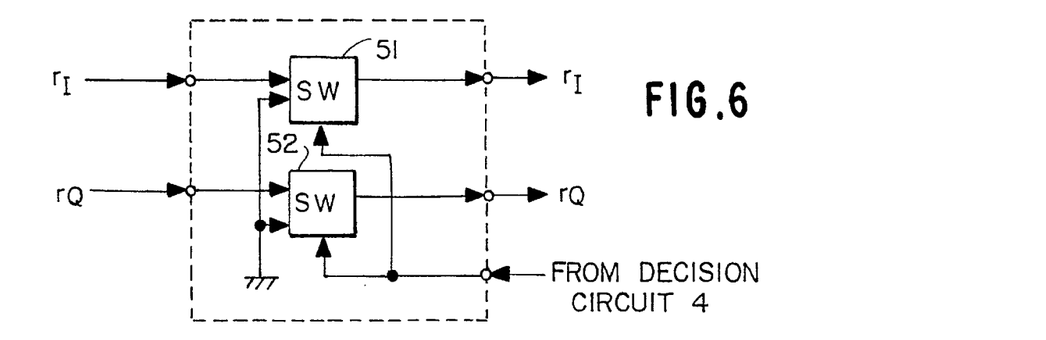
FIG. 6 shows an embodiment of the selector of the embodiment of the present invention illustrated in FIG. 1.

FIG. 6 is a diagram illustrating the configuration of the selector 5. In this diagram, demodulated signals $r_I$ and $r_Q$ from the demodulator 1 are input into switching circuits 51 and 52, respectively, of the selector. Both switching circuits 51 and 52 are controlled by the output signal of the decision circuit 4.

Thus, switching circuits 51 and 52 allow the demodulated signals provided from the demodulator 1 to be supplied as they are when the output of the decision circuit 4 is at its high level. Conversely, when the output of the decision circuit 4 is at its low level, the switching circuits 51 and 52 select the low-level signals (i.e. ground) and supply them to the UW-detector 6.

Between times $t_3$ and $t_5$, if the input signals received by the demodulator 1 are attenuated by shadowing or the like, the output signal level of the low-pass filter 3 begins to drop at time $t_3$ until it falls beyond the threshold level of the decision circuit 4 at time $t_4$. Then, the decision circuit 4, as shown in FIG. 7(C), supplies a received signal detection-interrupt signal having a low level.

As shown in FIG. 7(D), this low-level received signal detection-interrupt signal causes the selector circuit 5 to select the fixed data (e.g ground) beginning at $t_4$, and supply that fixed data to the unique word detecting circuit 6. As described, this fixed data is selected in a pattern unrelated to unique words, for example, all "0".

At time $t_5$, when received signals are again input into the demodulator 1, the selector 5 at time $t_6$ again selects the demodulated received signals as shown in FIG. 7(D). The above-described operation is then repeated.

In this procedure, note that during the period from time $t_1$ to $t_2$, the selector 5 selects the fixed data instead of the received demodulated data. The length of period from $t_1$ to $t_2$ is dependent on the value of the time constant of the low-pass filter 3 and of the threshold of the decision circuit 4 in the signal detecting means 9.

For this reason, the time constant of the low-pass filter 3 and the threshold of the decision circuit 4 are selected so that the output signal level of the low-pass filter 3 reaches the threshold level before the portion of the detected demodulated signal containing the unique word has been provided to the selector 5. This assures that the signal detecting means 9 will recognize that an actual demodulated signal has been received before the portion of that signal containing the first unique word is provided to the selector 5. Hence, the selector will be already set by the high-level received signal detection signal, provided by the decision circuit 4, to pass the portion of the received demodulated signal containing the unique word to the UW detector 6.

The UW detector 6 detects a unique word UW from the demodulated signals. When a UW is detected in the UW detector, a frame synchronising circuit 7 sets the timing for receiving the frames based on a predetermined, prestored frame format corresponding to the detected UW.

An aperture generator 8 controls the detection aperture of the UW detector 6 in accordance with the output signal of the frame synchronizing circuit 7. The aperture of the UW detector 6 is the time period that the UW detector remains "open" to detect the communication signal. Thus, the UW detector 6, frame synchronizing circuit 7 and aperture generator 8 cooperate to establish frame synchronization.

Accordingly, in this embodiment, when the decision circuit 4 indicates that actual communication signals are being received, the selector 5 supplies demodulated signals, enabling the above-described operation to maintain frame synchronization. On the other hand, when communication signals are interrupted and not detected, or when signal power is too low for the demodulator 1 to detect, the interrupt-detection signal is supplied from the decision circuit 4 to cause the selector 5 to provide fixed data to the UW detector 6.

Since this fixed data has a pattern unrelated to unique words, there is no possibility that the UW detector 6 would mistakenly detect the fixed data as a unique word. Hence, erroneous detection of unique words can be prevented, and erroneous frame timing can be minimized to assure reliable satellite channel detection. Furthermore, the phase of the received signal, when determined in accordance with the unique words, is more reliably ascertained.

The present invention is not to be restricted to the above-described preferred embodiment, but can also be used in receivers of digital satellite communication signals produced by other type of phase shift keying, such as offset QPSK (OQPSK) and 8 PSK. Furthermore, although the selector 5 is disposed between the unique word detector 6 and the demodulator 1 in the above-described embodiment, the present invention is not limited to this arrangement.

Figure 8:
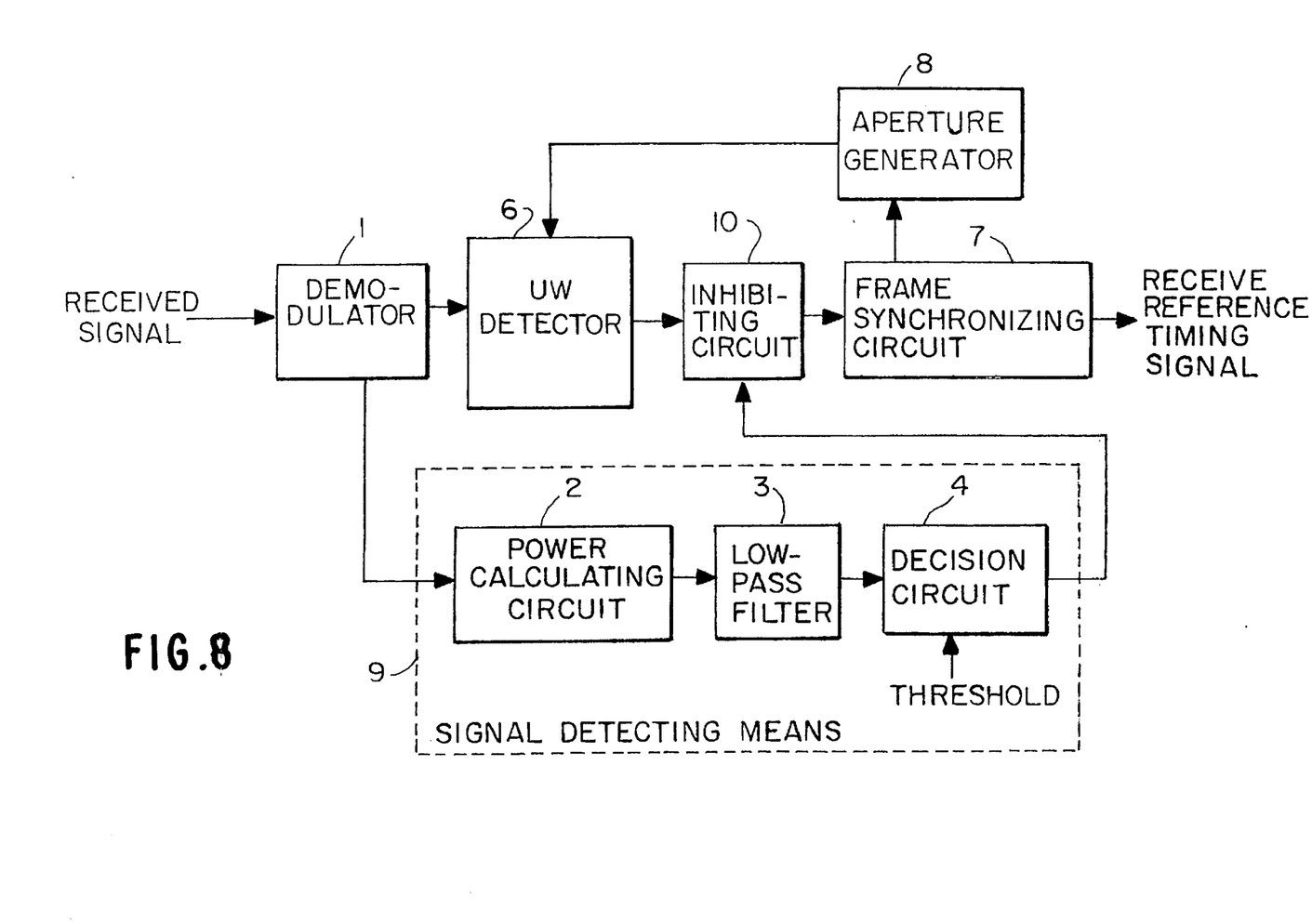
FIG. 8 is a block diagram of another embodiment of a frame synchronization system of the present invention.

For example, FIG. 8 illustrates another embodiment of the present invention. Those components illustrated in FIG. 8 which are identical to those in FIG. 1 perform the same functions, and accordingly, their description is abbreviated.

In this embodiment, the output signals of the demodulator 1 are input into the UW detector 6. The output signals of the UW detector 6 are input to an inhibiting circuit 10. When a received signal is detected by the signal detecting means 9 as described with regard to the embodiment of FIG. 1, the output of the UW detector 6 is input to the frame synchronizing circuit 7.

Alternatively, when a received signal is not detected by the signal detecting means 9 as described above with regard to the embodiment of FIG. 1, the output of the UW detector 6 is inhibited by the inhibiting circuit 10. Thus, for example, a low level signal, which is unrelated to the unique words, is input to the frame synchronizing circuit 7. Thus, the frame synchronizing circuit will determine that this low level signal is not a unique word and thus, will not cause the aperture generator 8 to control the aperture of the UW detector 6.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed:

1. An apparatus for establishing frame synchronization in a satellite communication system which receives a modulated signal having frames, a unique word and data being multiplexed in each of said frames, said apparatus comprising:

means for demodulating said modulated signal and providing a demodulated signal, said demodulated signal including said unique word;

signal detecting means for comparing the signal power of said demodulated signal with a threshold signal and providing a detection signal selecting means for providing, in accordance with said detection signal, one of said demodulated signal and fixed data, which is different from said unique word as a selected signal; and frame synchronizing means which is operative for detecting said unique word from said selected signal when said demodulated signal is provided as said selected signal by said selecting means, and establishing frame synchronization based on said unique word, and wherein said frame synchronization means is not operative for detecting said unique word when said fixed data is provided as said selected signal.

2. An apparatus as claimed in claim 1, wherein said signal detecting means comprises:

means for calculating said signal power of said demodulated signal and providing a signal power signal;

means for averaging values of said signal power signal calculated by said calculating means over a period of time and providing an average power signal; and means for comparing said average power signal with said threshold signal and providing said detection signal.

3. An apparatus as claimed in claim 2, wherein said calculating means comprises:

means for squaring an in-phase component of said demodulated signal and providing a first square signal;

means for squaring a quadrature component of said demodulated signal and providing a second square signal; and means for adding said first and second square signals to provide said signal power signal.

4. An apparatus as claimed in claim 1, wherein said frame synchronizing means comprises:

means for detecting said unique word from said selected signal;

means for setting timing at which said frames are detected to establish and maintain frame synchronization; and means for generating, in accordance with said timing set by said setting means, aperture signals, said unique word detecting means detecting said unique word in each of said frames in accordance with said aperture signals.

5. An apparatus as claimed in claim 1, wherein said selecting means provides said demodulated signal as said selected signal when said detection signal indicates that an average signal power level of said demodulated signal is at least equal to said threshold signal, and provides said fixed data as said selected signal when said detection signal indicates that said average signal power level of said demodulated signal is lees than said threshold signal.

6. An apparatus for establishing frame synchronization in a satellite communication system which receives a modulated signal having frames, a unique word and data being multiplexed in each of said frames, said apparatus comprising:

means for demodulating said modulated signal and providing a demodulated signal, said demodulated signal including said unique word;

signal detecting means for comparing the signal power of said demodulated signal with a threshold signal and providing a detection signal;

means for detecting said unique word from said demodulated signal and providing a unique word signal;

inhibiting means for providing, in accordance with said detection signal, one of said unique word signal and an inhibited signal when an actual communication signal is not detected as an output signal; and means for establishing frame synchronization in accordance with said output signal when said unique word signal is provided as said output signal by said inhibiting means.

7. Art apparatus as claimed in claim 6, wherein said signal detecting means comprises:

means for calculating said signal power of said demodulated signal and providing a signal power signal;

means for averaging values of said signal power signal calculated by said calculating means over a period of time and providing an average power signal; and means for comparing said average power signal with said threshold signal and providing said detection signal.

8. An apparatus as claimed in claim 7, wherein said calculating means comprises:

means for squaring an in-phase component of said demodulated signal and providing a first square signal;

means for squaring a quadrature component of said demodulated signal and providing a second square signal; and means for adding said first and second square signals to provide said signal power signal.

9. An apparatus as claimed in claim 6, wherein said frame synchronizing means comprises:

means for setting timing at which said frames are detected to establish and maintain frame synchronization; and means for generating, in accordance with said timing set by said setting means, aperture signals, wherein said unique word detects means detecting said unique word in each of said frames in accordance with said aperture signals.

10. An apparatus as claimed in claim 6, wherein said inhibiting means provides said unique word signal as said output signal when said detection signal indicates that an average signal power level of said demodulated signal is at least equal to said threshold signal, and provides said inhibited signal as said output signal when said detection signal indicates that said average signal power level of said demodulated signal is less than said threshold signal.

11. An apparatus for establishing frame synchronization in a satellite communication system which receives a modulated signal having frames, a unique word and data being multiplexed in each of said frames, said apparatus comprising:

a demodulator for demodulating said modulated signal and providing a demodulated signal, said demodulated signal including said unique word;

a signal detector for comparing the signal power of said demodulated signal with a threshold signal and providing a detection signal;

a selector for providing, in accordance with said detection signal, one of said demodulated signal and fixed data as a selected signal; and a frame synchronizing circuit for detecting said unique word from said selected signal when said demodulated signal is provided as said selected signal by said selector, and establishing frame synchronization based on said unique word.

12. An apparatus as claimed in claim 11, wherein said signal detector comprises:

a power calculating circuit for calculating said signal power of said demodulated signal and providing a signal power signal;

a filter for averaging values of said signal power signal calculated by said power calculating circuit over a period of time and providing an average power signal; and a comparator for comparing said average power signal with said threshold signal and providing said detection signal.

13. An apparatus as claimed in claim 12, wherein said power calculating circuit comprises:

a first multiplier for squaring an in-phase component of said demodulated signal and providing a first square signal;

a second multiplier for squaring a quadrature component of said demodulated signal and providing a second square signal; and an adder for adding said first and second square signals to provide said signal power signal.

14. An apparatus as claimed in claim 11, wherein said frame synchronizing circuit comprises:

a circuit for detecting said unique word from said selected signal;

a circuit for setting timing at which said frames are detected to establish and maintain frame synchronization; and a circuit for generating, in accordance with said timing set by said setting circuit, aperture signals, wherein said unique word detecting circuit detects said unique word in each of said frames in accordance with said aperture signals.

15. An apparatus as claimed in claim 11, wherein said selecting circuit provides said demodulated signal as said selected signal when said detection signal indicates that an average signal power level of said demodulated signal is at least equal to said threshold signal, and provides said fixed data as said selected signal when said detection signal indicates that said average signal power level of said demodulated signal is less than said threshold signal.

16. An apparatus for establishing frame synchronization in a satellite communication system which receives a modulated signal having frames, a unique word and data being multiplexed in each of said frames, said apparatus comprising:

a demodulator for demodulating said modulated communication signal and providing a demodulated signal, said demodulated signal including said unique word;

a signal detector for comparing the signal power of said demodulated signal with a threshold signal and providing a detection signal;

a circuit for detecting said unique word from said demodulated signal and providing a unique word signal;

an inhibiting circuit for providing, in accordance with said detection signal, one of said unique word signal and an inhibited signal as an output signal; and a frame synchronizing circuit for establishing frame synchronization in accordance with said output signal when said unique word signal is provided as said output signal by said inhibiting circuit.

17. An apparatus as claimed in claim 16, wherein said signal detector comprises:

a power calculating circuit for calculating said signal power of said demodulated signal and providing a signal power signal;

a filter for averaging values of said signal power signal calculated by said calculating circuit over a period of time and providing an average power signal; and a comparator for comparing said average power signal with said threshold signal and providing said detection signal indicative thereof.

18. An apparatus as claimed in claim 17, wherein said calculating circuit comprises:

a first multiplier for squaring an in-phase component of said demodulated signal and providing a first square signal;

a second multiplier for squaring a quadrature component of said demodulated signal and providing a second square signal; and an adder for adding said first and second square signals, to provide said signal power signal.

19. An apparatus as claimed in claim 16, wherein said frame synchronizing circuit comprises:

a circuit for setting timing at which said frames are detected to establish and maintain frame synchronization; and a circuit for generating, in accordance with said timing set by said setting circuit, aperture signals, wherein said unique word detects circuit detecting said unique word in each of said frames in accordance with said aperture signals.

20. An apparatus as claimed in claim 16, wherein said inhibiting circuit provides said unique word signal as said output signal when said detection signal indicates that an average signal power level of said demodulated signal is at least equal to said threshold, and provides said inhibited signal as said output signal when said detection signal indicates that said average signal power level of said demodulated signal is less than said threshold.

21. A method for establishing frame synchronization in a satellite communication system which receives a modulated signal having frames, a unique word and data being multiplexed in each of said frames, said method comprising the steps of:

demodulating said modulated signal which has been received to provide a demodulated signal;

comparing the signal power of said demodulated signal with a threshold signal and providing a comparison signal;

detecting said unique word and, in accordance with said comparison signal, establishing and maintaining frame synchronization based on said unique word; and discontinuing frame synchronization in accordance with said comparison signal.

22. A method as claimed in claim 21, wherein said comparing step comprises the steps of:

calculating the signal power of said demodulated signal and providing a signal power signal;

averaging values of said signal power signal calculated over a period of time and providing an average power signal; and comparing said average power signal with said threshold signal and providing said comparison signal.

23. A method as claimed in claim 22, wherein said calculating step comprises the steps of:

squaring an in-phase component of said demodulated signal and providing a first square signals;

squaring a quadrature component of said demodulated signal and providing a second square signal; and adding said first and second square signals to provide said signal power signal.

24. A method as claimed in claim 21, wherein said establishing step comprises the step of setting timing at which said frames are detected to establish and maintain frame synchronization.

25. A method for establishing frame synchronization in a satellite communication system which receives a modulated signal having frames, a unique word and data being multiplexed in each of said frames, said method comprising the steps of:

demodulating said modulated signal which has been received to provide a demodulated signal;

comparing the signal power of said demodulated signals with a threshold and providing a comparison signal;

detecting said unique word;

providing, in accordance with said comparison signal, one of said unique word and an inhibited signal as a first signal;

establishing and maintaining frame synchronization in accordance with said unique word when said unique word is provided as said first signal; and discontinuing frame synchronization when said inhibited signal is provided as said first signal.

26. A method as claimed in claim 25, wherein said comparing step comprises the steps of:

calculating the signal power of said demodulated signal and providing a signal power signal;

averaging values of the signal power signal calculated over a period of time and providing an average power signal; and comparing said average power signal with said threshold signal to provide said comparison signal.

27. A method as claimed in claim 25, wherein said calculating step comprises the steps of:

squaring an in-phase component of said demodulated signal and providing a first square signal;

squaring a quadrature component of said demodulated signal and providing a second square signal; and adding said first and second square signals to provide said signal power signal.

28. A method as claimed in claim 25, wherein said establishing step comprises the step of setting timing at which said frames are detected to establish and maintain frame synchronization.

* * * * *